Patented Nov. 25, 1930

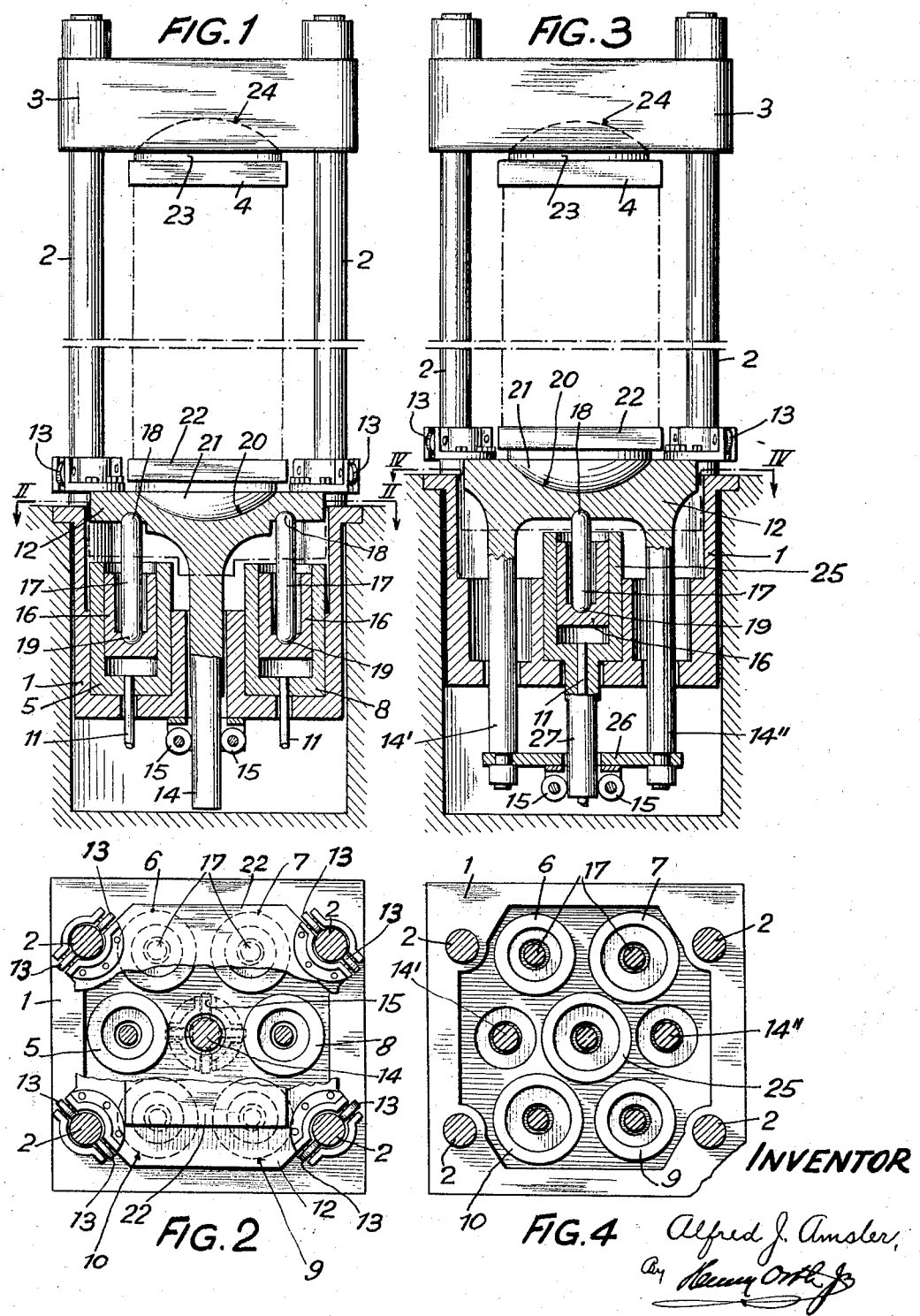

1,782,595

UNITED STATES PATENT OFFICE

ALFRED J. AMSLER, OF SCHAFFHAUSEN, SWITZERLAND

HYDRAULIC PRESS PARTICULARLY FOR TESTING MATERIALS

Application filed July 5, 1929, Serial No. 376,234, and in Germany May 14, 1929.

The hydraulic presses, in which the liquid pressure serves for measuring the effect, heretofore used, for testing the strength of materials are provided with a single press cylinder and ram. The larger the diameter of the press ram the more difficulties arise in packing the same so as to prevent leakage of liquid and the more the frictional resistance opposing the movement of the ram increases. At high pressure the ratio between the friction resistance and the force exerted by the ram is substantially smaller than at low pressures. When the pressure of the liquid in the cylinder serves for measuring the force exerted the influence of the frictional resistance encountered by the ram, therefore, is different with high or low liquid pressures so that the force exerted by the ram is not proportional to the pressure of the liquid, and, consequently, not obtainable from the measuring apparatus in reliable manner even if the pressure indications thereof are exact. Thus the range of measuring of a testing machine, having a single presspot is limited if a certain percentage of error dare not be exceeded.

In the hydraulic press, according to the invention, several presspots are provided and are so arranged relatively to the central axis of the press that the presspots work in groups and the resulting force of every group acts in the central axis of the press, thus, enabling to vary the range of measuring of the press according to the resistance encountered, in that a suitable number of groups of presspots is caused to be operated by the liquid pressure. Further, the sum of the frictional resistances acting on each individual ram, is, owing to the smaller diameter of the rams, smaller than that acting on a correspondingly larger single ram. Furthermore, the output of the press may be increased at will by providing and operating a corresponding number of presspots, without the necessity of employing exceedingly large rams. A further advantage resulting from replacing a single large presspot by several small presspots is that the measuring apparatus available for the calibration of smaller presspots are more exact than those for the larger ones.

In the drawing two constructional examples of a press, embodying the invention, are illustrated in which:

Fig. 1 is an elevation, partly in section, of a first embodiment;

Fig. 2 is a horizontal section on the line II—II in Fig. 1;

Fig. 3 is an elevation and partly a vertical section of a second embodiment, and Fig. 4 is a horizontal section on the line IV—IV in Fig. 3.

The hydraulic press illustrated in Figs. 1 and 2 substantially comprises the base 1, which contains the press mechanism, the four columns 2, which are rigidly connected to the base 1, and the upper cross-head 3 in which the upper press plate 4 is mounted.

The press mechanism is provided with six presspots 5, 6, 7, 8, 9 and 10 which are arranged in three groups of two presspots each, whereby, the two presspots of each group are situated equidistantly from the central axis diametrically opposite each other; in this example all the presspots are of the same size. Thus, the resulting force exerted by each operative group is acting in the central axis. Alternatively, the dimensions of the presspots of each group might be different. The admission conduits for the pressure liquid are designated by 11. If, for example, each presspot be dimensioned to exert a pressure of 200 tons an output of the whole press of 400, 800 or 1200 tons respectively is obtainable by applying liquid pressure to one or more groups respectively, while the liquid pressure remains the same. Having a definite delivery of liquid at disposal, it is evident that the rams of one group only of the presspots will rise quicker than the rams of all the groups together.

All the rams are operatively connected to the table 12 which is guided in the vertical direction by means of guide rollers 13, running in pairs along columns 2, as well as by a downwardly projecting shaft 14 between rollers 15 which are mounted in the base, 1, so that the table is displaceable in the said direction practically without being impeded by friction. The shafts of the rollers 13 extend in pairs parallel to the diagonals of the square base for the columns and the shafts of the rollers 15 extend in pairs parallel to the sides of the said square, whereby, an effective guiding is obtained. Between the ram 16 of each presspot and the table 12 a stud 17 is inserted which studs bear at their ends, by means of spherical portions 18 and 19, against the table 12 and the centre of the pistons respectively. Thereby is attained that, when the reaction of the body to be pressed is eccentric, lateral pressures on the table are not to be taken up by the rams of the presspots but by the frame of the press. Moreover, the table 12 is provided in its upper part with a spherical portion 20 which accommodates a correspondingly shaped plate 21 which is adapted to tilt in either direction when the surface with which it co-operates is not exactly horizontal. The plate 21 supports the lower press plate 22. In similar manner provision is made in the upper cross-head 3 for the press plate 4 to bear against a plate 23 having a spherical portion 24.

The embodiment shown in Figs. 3 and 4 differs from the above-described embodiment by the arrangement of the presspots, in that two pairs of opposite presspots 6, 9 and 7, 10 are provided at equal distances from the central axis of the press as well as a further presspot 25 in the said central axis. In this special case the presspots 6, 9 are smaller than the presspots 7, 10 and 25. Thereby, different graduations for the effect of the press are obtainable, depending upon, whether the presspot 25 alone is operative or the pairs of presspots 6, 9 and 7, 10 each alone or together or each group together with the presspot 25 or all the presspots combined.

Instead of a single central shaft 14, as in the first embodiment, the table 12 is provided with two downwardly projecting shafts 14' and 14", the lower ends of which are interconnected by a transverse bar 26 which carries the bearings for the guide rollers 15. The latter cooperate with a central shaft 27 fixed to the presspot 25 and are guided by the said shaft when the table 12 under the influence of the presspots moves upward. The shaft 27 might also be fixed to the base 1 or form an integral part of the latter respectively.

The subdivision of presspots into groups can be effected at will and, thus, the effect of the press can be varied in any desired degrees. This method of subdividing enables presses to be constructed for the greatest effects required in practice.

I claim:

1. In a hydraulic press, particularly for testing the strength of materials and in which the liquid pressure serves for measuring the load exerted, in combination, a plurality of presspots arranged around the central axis of the press in such a manner as to cooperate in groups each group exerting a resultant force which acts in the central axis, each presspot consisting of a cylinder and a ram, a frame, a table movable along said frame and adapted to bear against the specimen to be pressed, and a stud interposed between every ram and said table and provided with spherical surfaces cooperating with similar shaped surfaces provided on the ram and on said table to prevent eccentric pressure on said table being transmitted to said rams.

2. In a hydraulic press, particularly for testing the strength of materials and in which the liquid pressure serves for measuring the load exerted, in combination, a plurality of presspots arranged around the central axis of the press in such a manner as to cooperate in groups each group exerting a resultant force which acts in the central axis, each presspot consisting of a cylinder and a ram, a press frame comprising a base in which said presspots are arranged, a head portion and columns connecting said base to said head portion, a table adapted to bear against the specimen and acted upon by said presspots, rollers interposed between said table and said columns for guiding the former, and further guide means for the table comprising at least one shaft guided by means of rollers relatively to the base.

3. In a hydraulic press, particularly for testing the strength of materials and in which the liquid pressure serves for measuring the load exerted, in combination, a plurality of presspots arranged around the central axis of the press in such a manner as to cooperate in groups each group exerting a resultant force which acts in the central axis, each presspot consisting of a cylinder and a ram, a press frame comprising a base in which said presspots are arranged, a head portion and four columns connecting said base to said head portion, a table adapted to bear against the specimen and acted upon by said presspots, rollers interposed between said table and said columns for guiding the former, said rollers being arranged in pairs parallel to the diagonals of the rectangle formed by the centers of the four columns, and further guide means for the table comprising at least one shaft guided by means of rollers relatively to the base.

In testimony whereof I have signed my name to this specification.

ALFRED J. AMSLER.